United States Patent
Lu

(10) Patent No.: US 10,769,570 B2
(45) Date of Patent: Sep. 8, 2020

(54) ARTIFICIAL INTELLIGENCE BASED RISK AND KNOWLEDGE MANAGEMENT

(71) Applicant: ACCENTURE GLOBAL SOLUTIONS LIMITED, Dublin (IE)

(72) Inventor: Mingzhu Lu, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 476 days.

(21) Appl. No.: 15/855,745

(22) Filed: Dec. 27, 2017

(65) Prior Publication Data

US 2019/0197442 A1    Jun. 27, 2019

(51) Int. Cl.
  *G06Q 10/06* (2012.01)
  *G06Q 20/40* (2012.01)
  *G06N 99/00* (2019.01)
  *G06N 20/00* (2019.01)

(52) U.S. Cl.
  CPC ......... *G06Q 10/0635* (2013.01); *G06N 20/00* (2019.01); *G06Q 20/4016* (2013.01)

(58) Field of Classification Search
  CPC ......... G06Q 10/06; G06Q 99/00; G06N 99/00
  USPC ............................................... 705/7.11–7.42
  See application file for complete search history.

(56) References Cited

U.S. PATENT DOCUMENTS 8,793,171 B2* 7/2014 Hollas ................ G06Q 10/0635
                                                                        705/35
2010/0324958 A1* 12/2010 Stiles ..................... G06Q 40/08
                                                                        705/7.28
2011/0106584 A1* 5/2011 Borthwick ............. G06Q 30/02
                                                                        705/7.31

(Continued)

FOREIGN PATENT DOCUMENTS

EP          3278213 A2 *  2/2018   ............. G06N 20/20

OTHER PUBLICATIONS

Wu, Desheng & Chen, Shu-heng & Olson, David. (2014). Business intelligence in risk management: Some recent progresses. Information Sciences. 256. 1-7. 10.1016/j.ins.2013.10.008. (Year: 2014).*

(Continued)

*Primary Examiner* — Alan S Miller
*Assistant Examiner* — Jay-Ming Wang
(74) *Attorney, Agent, or Firm* — Mannava & Kang, P.C.

(57) ABSTRACT

Examples of artificial intelligence based risk and knowledge management analysis are described. In an example implementation, a data analyzer may obtain entity data pertaining to an entity associated with a risk management instrument. The entity data may include data obtained from an IoT device and/or a risk control and knowledge management database. The entity data may be processed by an intelligent risk management agent to perform a variety of risk control and knowledge management tasks, such as claim processing, notification generation, formulization of risk management instruments, and assisting agents, users, and organization. The claim processing may include, for instance, identification of a similar case from database. The notification generation may include analysis with respect to reference parameters. The formulization of risk management instrument may include analysis with respect to the entity data from multiple domains and/or various external factors.

20 Claims, 8 Drawing Sheets

(56) References Cited

U.S. PATENT DOCUMENTS

2011/0167357 A1* 7/2011 Benjamin .......... H04L 12/1818
715/753

OTHER PUBLICATIONS

Birzniece, Ilze. (2011). Artificial Intelligence in Knowledge Management: Overview and Trends. J. Riga Technical University. 43. 5-11. 10.2478/v10143-011-0001-x. (Year: 2011).*

* cited by examiner

ARTIFICIAL INTELLIGENCE BASED RISK AND KNOWLEDGE MANAGEMENT

BACKGROUND

Normally, to have protection against financial losses, which may arise due to damage to resources such as, for example, property, vehicles, and other valuable items, a variety of risk management instruments are provided by various organizations. A risk management instrument may be in form of a contract involving an end user, i.e., a user who wishes to have protection against such damages, and an organization, which provides such risk management instruments. One or more risk management instruments may be offered to a user by an organization based on needs and requirements of the user and the assessment of the user by the organization.

In case of damage to a resource, the user may claim benefits to compensate the financial loss that may have occurred due to the damage. Such losses may be financial or may be reducible to financial terms. The organization, on receiving such a claim settlement request, may assess the extent of damage to the resource; and based on the conditions of the risk management instrument, determine corresponding losses and compensate the user.

The process of determining a suitable risk management instrument and subsequent damage assessment is often complex, cumbersome, requires skilled labor/worker, and is prone to errors. For instance, in case of an inappropriate risk management instrument being selected, either the user may not be adequately covered or the organization may have to bear expenses, which could have been avoided if the risk management instrument was intelligently selected for the user. Likewise, damage assessment involves physical analysis a resource, which may be limited by human resources or their limited knowledge and skills. In case of inappropriate damage assessment, either the organization may have to compensate for losses, that weren't present or a user may be under-compensated.

Moreover, supervisory control and data acquisition (SCADA) system and network are applied as ways of gathering and analyzing data within risk management domain as corner bars. However, such a system may also have certain disadvantages and limitations. The network and SCADA system may be a wireless network, a wired network, or a combination thereof. Such networks, as would be appreciated include a variety of network devices, including routers, bridges, servers, computational devices, storage devices, and the like. In this kind of infrastructure and network organizations, the network and SCADA system connections are easily removed, easily disconnected, unreliable, and troublesome oftentimes.

Thus, the selection of an appropriate risk management instrument, damage assessment (also referred to as claim adjudication), and instant repair/recover services often require skilled worker, which may make the entire process costly, time consuming, and resource intensive. Still further, despite possessing highly skilled worker, the knowledge of the worker may be limited to certain domains, thereby making the entire process inefficient. Moreover, such processes are prone to errors due substantial manual intervention and analysis, for instance, due to biased judgments and lack of knowledge.

On the other hand, an automated system, for instance, a systematic implementation of an automated claim adjudication process, may not be able to efficiently replicate human knowledge, which may also result in errors and inefficient utilization of computational resources deployed for automated analysis. Moreover, currently available systems focus on a reactive approach, i.e., compensating when damage has occurred but may lack mechanisms to proactively prevent such damages from occurring.

This presents a technical problem of devising risk management systems that can provide for efficient analysis of risk management instruments to reduce cost (computational and otherwise), minimize computational and other errors, and better utilization of manual and computational resources. This disclosure involves creations and selections of a suitable risk management solution/tool/instrument, reasonable policies/contracts, appropriate determination of damages, proactive prevention of probable damage, and intelligent and prompt damage repairs, which provides protections against losses including financial losses, intangible assets losses, and opportunity costs.

BRIEF DESCRIPTION OF DRAWINGS

Features of the present disclosure are illustrated by examples shown in the following figures. In the following figures, like numerals indicate like elements, in which.

DETAILED DESCRIPTION

Figure 1:
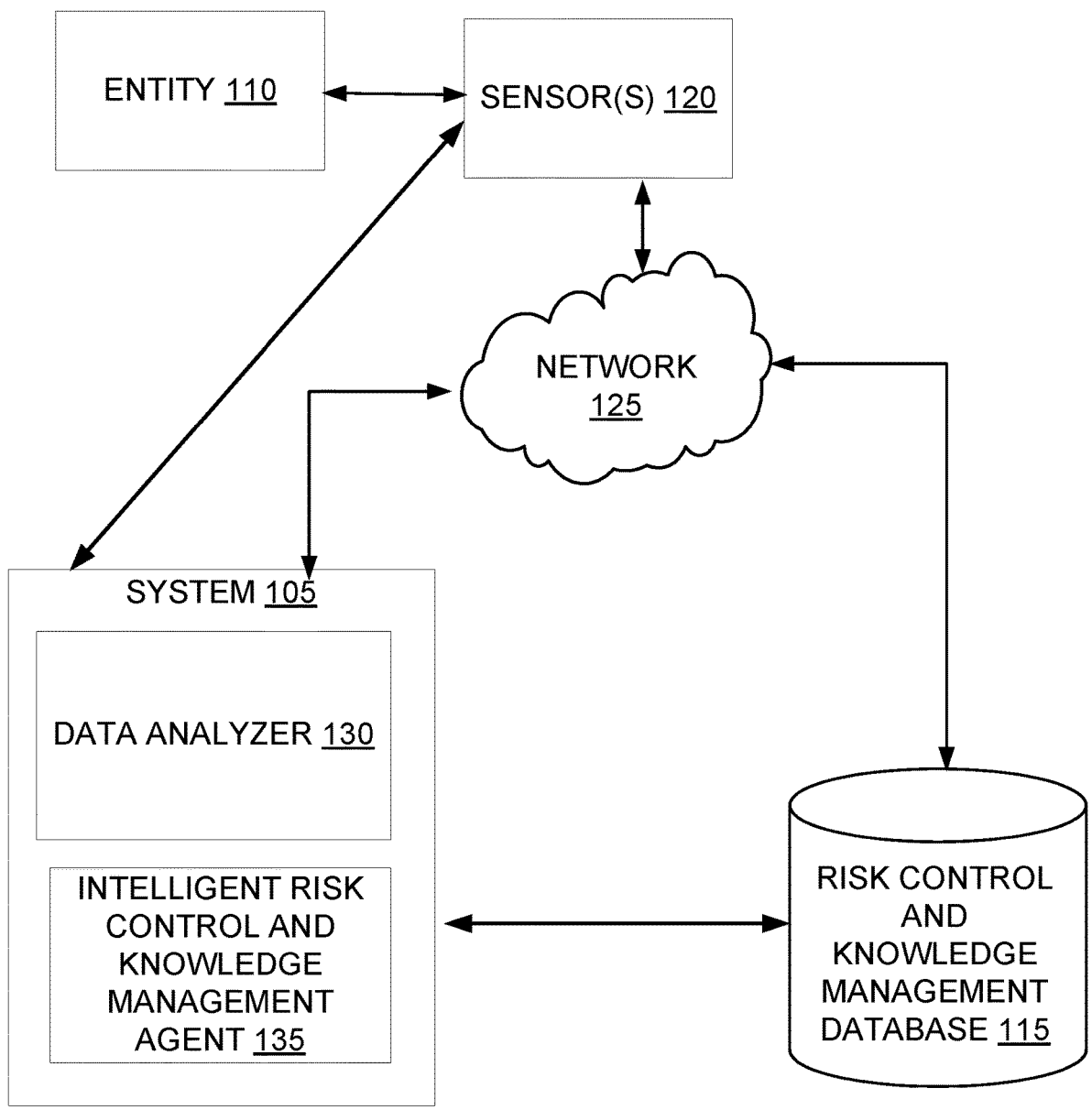
FIG. 1 illustrates a systematic implementation within a network environment, according to an example of the present disclosure.

For simplicity and illustrative purposes, the present disclosure is illustrated by referring mainly to examples thereof. The examples of the present disclosure illustrated herein may be used together in different combinations. In the following description, details are set forth in order to provide an understanding of the present disclosure. It will be readily apparent however, that the present disclosure may be practiced without limitation to all these details. Also, throughout the present disclosure, the terms "a" and "an" are intended to denote at least one of a particular element. As used herein, the term "includes" means includes but not limited to, the term "including" means including but not limited to. The term "based on" means based at least in part on, the term "based upon" means based at least in part upon, and the term "such as" means such as but not limited to.

The present disclosure describes systems and methods for artificial intelligence and Internet of things based risk control and knowledge management. The present disclosure assists organizations offering risk management instruments and end users intelligently, i.e., the users claiming benefits from such risk management instruments. In event of damage to an entity covered by a risk management instrument, an organization offering the risk management instrument bears the financial loss, upon claim adjudication. The entity may be, for instance, a property, such as a building and a house, a vehicle, such as a car, an appliance, such as a television, and the like.

The disclosure creates intelligent agent assistants based upon internet of things and artificial intelligence across the entire risk management cycles and every aspect of the risk control management and knowledge management, which aims to proactively prevent any potential damages, intelligently handle the risk management, appropriately generate and select the knowledge, fairly determine the damages and payments to the loss claims, promptly repair the damages or recover the services, and accurately provide protections against any losses, including financial losses, intangible assets losses, and opportunity costs.

In an example of the present disclosure, the system could include a data analyzer and an intelligent risk control and knowledge management agent(s). The data analyzer and the intelligent risk control and knowledge management agent may be in communication with each other to perform the functionalities of the system.

Further, in an example, the system may be communicatively coupled to one or more Internet of things (IoT) devices, such as sensors, and a risk management database through one or more communication links, where the sensors can be upgraded or replaced along with the Internet of things technologies. Moreover, the sensors may associate with an entity to be covered by a risk management instrument. The sensors may aid in monitoring health of the entity and may provide for physical or mental diagnostics of the entity to help identify damages that have occurred or the damages that may occur in future. The database may include a reference repository having information pertaining to damages to other similar entities and details pertaining to a risk control and knowledge management instrument, such as, a product ID and terms and conditions of the risk management instrument; an instrument ID, and policies and contracts of the risk management instrument. The entity information repository to store sensor data pertaining to the entity, such as images of damaged entity and entity prior to damage.

The data pertaining to the entity may be gathered and analyzed by a data analyzer. The entity data may include data obtained from sensors and data pertaining to a risk management instrument covering the entity. Moreover, this system applies the Internet of things techniques, which may gather the live data simultaneously via remote sensing and/or IoT monitoring. This data may be communicated and processed by the data analyzer instantaneously. In some situations, the entity data may be gathered periodically or on receiving an external trigger, which is a reactive approach with obvious lags and cannot be satisfied the scenarios of proactive risk management and prompt protections. The data analyzer may obtain the data from sensors as soon as the sensors receive the data; and may associate the same with the relevant entity. Further, the data analyzer, in an example implementation, normalize entity data to reduce errors, which may arise due to factors such as sensors with different data gathering frequencies or rates, sensor instrument aging, and environmental variations. Further, the normalized data may be assimilated with a model/corresponding to the risk management instrument associated with the entity using assimilation techniques, such as weighted least square finite element method.

Moreover, the assimilated data may then be analyzed with respect to the risk control and knowledge management database by the intelligent risk control and knowledge management agent. For instance, the analysis may be with respect to historical data, real time data, and live streaming data, which may pertain to a case similar to an entity under consideration or data pertaining to previously monitored statistics of the entity.

The analysis with respect to a similar case may aid in efficient claim adjudication and analysis pertaining to previously monitored statistics or the constant live monitoring of the entity. This analysis may potentially also assist in identifying potential damages to prevent such damages from occurring. Further, an analysis of the historical data, real time data, and live monitoring data for multiple entities can usually support risk control and knowledge management with respect to emerging risks and knowledge or to reformulate a risk control model or knowledge management tool for a user, where the artificial intelligence techniques are used, including machine learning, data mining, and knowledge discovery.

Thus, the analysis may be performed based on a goal to be achieved, and the analyzed data may be processed by the intelligent risk control and knowledge management agent to provide a desired output, such as claim adjudication, fraud detection, alert and advice generation, formulization of new risk management instruments or policies, and renewing of existing risk management instruments or existing contracts and policies. The data analyzer and the intelligent risk control and knowledge management agent implement a combination of Artificial Intelligence (AI) and machine learning techniques to analyze and further subsequent process of the analyzed data.

For instance, in case of a claim process request, the intelligent risk control and knowledge management agent determines an extent of damage to the entity, based on assimilated entity data or comparison of the entity pro-damage. Further, the one or more similar cases may be identified from the database using similarity techniques, such as cosine similarity and Jacob similarity. Upon identification of a similar case, the compensation details of the similar case may be used to determine compensation or loss payment for a present claim adjudication/process request by the intelligent risk control and knowledge management agent(s). This information generated by the intelligent risk control and knowledge management agent may be used by an internal or external agent assistants, such as field technicians, internal claims processing officers, and brokers, while the claim request are processed. Thus, even in the absence of knowledge pertaining to a given domain, the present disclosure provides efficient claim adjudication and processing of requests.

Moreover, since the entity data may be gathered remotely using sensors, an external agent need not visit the claim site or the knowledge gathered by the external agent may be supplemented by the assimilated data. This may result in better utilization of time and resources. Further, as the knowledge of the internal and external agent may be supplemented, the computational resources and time, that may have been used due to limited knowledge and repeated errors, may now be saved.

Additionally, the entity data may be also used to identify emerging risk zones and formulate risk management instruments, which includes risk model creations, policies and contracts, renewing and revising the existing ones. The intelligent processing of the assimilated sensor data may help bridge the gap, which may be created due to unavailability of the skilled workers. The existing resources may benefit from the inputs provided by the intelligent risk control and knowledge management agent.

In other examples, the entity data may be used to identify potential or emerging risks, generate alerts, and provide the advices on how to react on the alerts by the intelligent risk control and knowledge management agent to prevent or lower the damage to the entity proactively. Such a proactive approach may help in minimizing losses and enhancing safe measure indexes. Again, the process may be substantially instrumented to minimize such as manual intervention, biases and errors introduces due to such intervention, and financial losses.

Thus, the present disclosure provides an efficient, proactive, and resource optimization mechanism for intelligently managing a variety of processes associated with risk instruments and knowledge management. Moreover, the disclosure may be used to perform a variety of tasks associated with the risk management instruments. The present system is convenient to implement and economical or inexpensive, while maintaining the accuracy and reliability. This disclosure has wide applications in the areas of, including but not limited to commercial sectors, consumer sectors, healthcare sectors, education sectors, and government compliance on risk and knowledge management with respect to processes and complex knowledge such as policies, regulations, and negotiations.

FIG. 1 illustrates a network environment 100 implementing a computing system 105, hereinafter referred to as system 105, according to an example of the present disclosure. In an example, the system 105 uses Artificial Intelligence (AI) techniques, such as machine learning, data mining, and knowledge discovery, to perform a variety of tasks/processes associated with a risk and knowledge management instrument. Examples of processes associated with a risk and knowledge management instrument include, but are not limited to, claim adjudication, alerts and advices generation, and risk evaluation and prediction models. The system 105 may provide for efficient risk control and knowledge management for entities 110 covered by risk management instruments. The entities 110 covered by a risk management instrument may include, for example, property, such as buildings and houses, vehicles, and appliances.

Moreover, in an example, the network environment 100 may be a public network environment, including thousands of individual computers, laptops, various servers, such as blade servers, and other computational devices and resources. In another example, the network environment 100 may be a private network environment with a limited number of computing devices, such as individual computers, servers, and laptops. Furthermore, the system 105 is implemented in various computing systems, such as a laptop, a desktop computer, quantum computers, a tablet, and the like.

According to an example, the system 105 communicates directly with a risk control and knowledge management database 115, also referred to as database 115, or via a network 125. Although, the database 115 has been illustrated as a single entity, it will be appreciated that various repositories may be provided on separate physical devices. The risk control and knowledge management database 115 may include a reference repository and entity information repository. The reference repository may include details pertaining to settled cases, i.e., where claim adjudication is settled and details pertaining to various risk management instruments, for instance, guidelines for applications acceptance from users requesting for coverage under a risk management instrument and metadata pertaining risk management instruments. The entities information repository may include details pertaining to the historical monitored and current monitoring health (physical condition) of various entities, environmental details of entity location, and/or details pertaining to damages to the entities.

The database 115 may also include other repositories, such as document repositories (policies and contracts) and other information sources, data stores, and/or third party applications.

According to an aspect of the present disclosure, one or more sensors 120 could be associated with an entity 110 to be monitored. The sensor 120 may have a direct communication to the system 105 and its components. In other examples, the system 105 may be in indirect communication with the sensors 120 via network 125.

The sensors 120, for example, may be IoT devices associated with entities 110. The sensors 120 may be, for instance, physically installed on the entity. In other examples, sensors 120 may capture certain data from remote sensing or remote monitoring techniques. The sensors 120 are usually registered with the system 105 to prevent errors due to reasons such as instrument aging or instrument malfunctioning. The sensors 120 provide sensor data, which includes details pertaining to entity attributes and environmental attributes. The entity attributes include details pertaining to physical condition of the entity and environment attributes include details pertaining to environmental factors at entity location, such as temperature, rain forecast, or details pertaining to other natural disasters, such as earthquakes, hurricanes, and floods.

Examples of the sensors 120 include, but are not limited to, image capturing devices, audio sensors, text analyzers, on-board diagnostics (OBD2) sensors, and the like. Further, the sensors 120 may be separately installed on the entities 110 or may use already available sensors 120 to gather data, such as information pertaining to environmental attributes, where the sensors and adaptors are implemented to track data, monitor performance, and diagnose the failures remotely.

In an example, the sensors 120 and the database 115 have the direct connection to system 105 or over a network 125. In an example, the direct connection may be reliable, inexpensive, may not remove or may not be easily disconnected. Internet of things may provide efficient processing and management as computing on the cloud, may be insufficient in many circumstances. The network 125 may also be an individual network or a collection of many such individual networks, interconnected with each other and functioning as a single large network, e.g., the Internet or an intranet. The network 125 may be implemented as one of the different types of networks, such as intranet, local area network (LAN), wide area network (WAN), the internet, and the like. The latest infrastructure design brings the data at the IoT edge by extending analytics platform capabilities from the cloud to the IoT "fog" layer. The infrastructure shown in FIG. 1 may be replaced and upgraded simultaneously as the IoT capabilities and technologies evolve or develop, which is to ensure to surpass any existing and potential "bottlenecks" or "edges".

Moreover, each component of the network environment 100 may include a security component or security function. For example, the network 125 may include network security component/sub-module to avoid network attacks. Another example, the risk control and knowledge management data storage 115 includes the security function to avoid data loss, and may include containers (such as a docker) to isolated the data storage to enable quick data access and reduce the data damage in case extreme conditions happen, such as power outage, no response from database, and insertion or deletion by errors.

According to an example, the system 105 may include a data analyzer 130 and an intelligent risk management agent 135. The data analyzer 130 and the intelligent risk management agent 135 may be in communication with each other to perform the functionalities of the system 105. The sensors 120 may send the data to the system 105 and database 115 simultaneously as it gathers the signals over time.

Moreover, in certain circumstances, the data analyzer 130 gathers data from the sensors 120 pertaining to an entity 110. The data analyzer 130 usually gathers the data simultaneously via such as remote sensing and IoT monitoring over time, where the received signals and data are communicated with related components and processed instantaneously. For instance, an agent may need the received data to build risk control models and conduct the damage loss payment estimation. Meanwhile, the risk control and database may receive and store the sensing data as knowledge for usage. The sensors 120 connects to a single or multiple entities 110 in one or multiple domains (for example, in different distances), while gathering information such as, geographical location, signal frequency, sensors attributes, and entity category.

The entity data obtained from sensors usually needs normalization because of the discrepancies that may be introduced due to multiple reasons, such as the signal frequency differences of the sensors, environmental factors and instrument tolerances. The normalization is part of the data preprocessing ahead of establishing the risk control models and processing procedures (such as loss estimation, contracts renewal, and claim process) pertaining to the entity under consideration of normalization, where various assimilation techniques may be used, such as weighted least square finite elements method. The data preprocessing and feature engineering techniques are applied to facilitate the creation of accurate risk control and related models, such as outlier detection, minimum redundancy, and information gain based techniques. Moreover, the normalized data, the assimilated data, and any intermediate data are stored in the database 115 with attributes, such as timestamp and sources.

The intelligent risk control and knowledge management agent 135 handles the applications requirements from different sectors, such as build and validate the risk control models, claim processing, loss estimation, and policy and contract formation and renewal. The intelligent risk control and knowledge management agent 135 includes and implements various AI, machine learning, and IoT techniques, such as ensemble learning techniques, pattern recognition, and image and data processing techniques.

In an example, the intelligent risk control and knowledge management agent 135 may analyze assimilated data with respect to data in the database 115 to identify one or more similar cases. For instance, in case of a claim adjudication process or claim processing, a case pertaining to similar damage to a similar entity may be identified, based on the analysis. For this purpose, the intelligent risk control and knowledge management agent 135 implements techniques, such as image vector similarity techniques and data analysis techniques. On identifying a similar case, the intelligent risk and knowledge management control management agent 135 may assist in claim processing. In an illustrative example, it may be determined whether the claim request is fraudulent. If not, the intelligent risk control and knowledge management agent 135 computes and predicts the claim related terms such as, estimated cost of damages, and the loss compensation, per the conditions of the risk control instrument and management covering the entity 110.

To cross out the boundaries and bottlenecks, which the current risk control and knowledge management may have, the intelligent risk control and knowledge management agent 135 identifies the potential and emerging risks and markets by the techniques, such as, dynamic AI data analysis, observable trends predictions, and fraudulent areas. The risk identifications, in the area of such as cyber, climate, nanotechnology, self-diving cars, and drones, may be conducted based on the received sensor data of multiple entities, such as climate, location and entity category. Upon the analysis, the intelligent risk control and knowledge management agent 135 determines the emerging risk domains and markets as explained in detail with reference to description of FIG. 2.

The intelligent risk control and knowledge management agent 135 includes notification generator (shown in FIG. 2) to notify the users existing and potential damages to the covered entities, and to provide advices on how to react to the alerts and damages. The agent 135 adopts the proactive approaches rather than reactive to the damages caused by the reasons such as natural disasters, human mistakes, equipment failures, and all kind of chaos situations, which prevents the potential damages and losses by alarming and advising the users before the damages happen and ahead of time. Thus, the data processed by data analyzer 130 may then be further utilized by the intelligent risk control and knowledge management agent 135 to perform the task. The functions of various components of the system 105 are further illustrated in detail in conjunction with FIG. 2.

Figure 2:
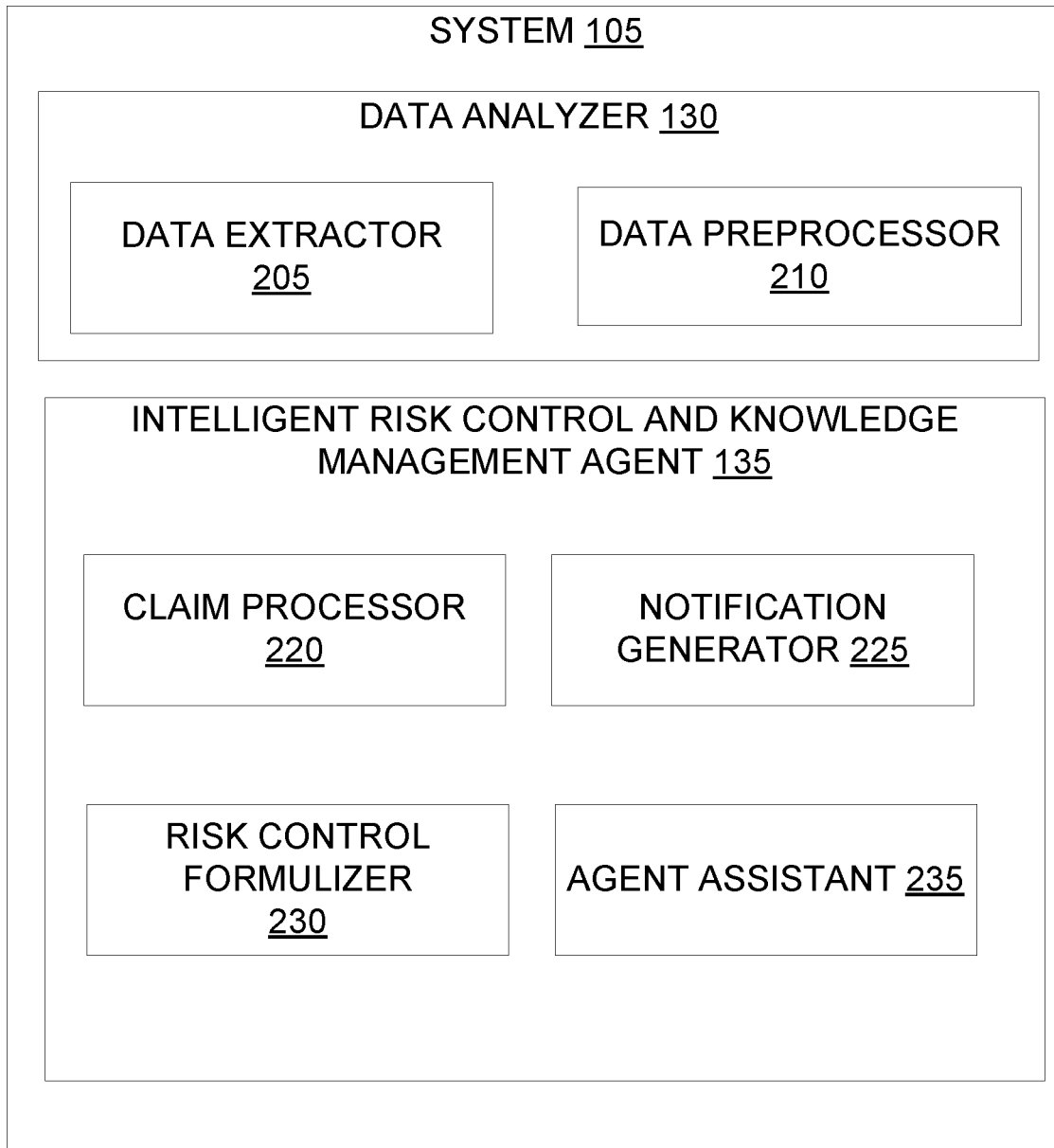
FIG. 2 illustrates a block diagram of the system, according to an example of the present disclosure.

FIG. 2 illustrates a block diagram of the system 105, according to an example of the present disclosure. As illustrated previously, the system 105, amongst other things, include the data analyzer 130 and the intelligent risk control and knowledge management agent 135. Moreover, the data analyzer 130 includes but is not limited to a data extractor 205 and a data pre-processor 210, which are in communication with each other. The intelligent risk control and knowledge management agent 135 includes a claim processor 220; a notification generator 225, to generate notifications including alerts and advices on how to react to the alerts; a risk control and knowledge management formulizer 230, and an agent assistant 235.

As mentioned, the system 105 is in communication to the sensors 120 and the database 115, which contains information such as the reference and the entity attributes. As part of data analyzer 130, the data extractor 205 obtains data directly or indirectly from the sensors 120 and database 115. Data from the sensors 120 is usually obtained simultaneously via techniques such as remote sensing and IoT monitoring over time, where the received signals and data are communicated with related components and processed instantaneously. The data may also be obtained on receiving a trigger, which may be provided by an external agent. The sensor data include details pertaining to entity 110 before and/or after claimed damages, where the details include images, text, and measured indexes and stored in database 115.

Moreover, the data extractor 205 includes the functions of data extraction and data crawling. Take claim processing task for example, the data extractor 205 obtains the entity data for one or more single entity(s). While conducting the risk control and knowledge management work, the entity data for multiple entities may be obtained. The data extractor 205 includes functions of establishing property image database, where property images are taken while contracts signed at different angles, scales, heights, etc.; claims image database, where the damaged property images are taken after the claims submitted of losses or disasters; and crash-image database, where the crashed images are pictured by agent assistants (such as field technicians) of the damaged entity(s). As mentioned earlier, data extracted may be stored in the database 115.

The data pre-processor 210 may determine whether the preprocessing of the entity data is to be performed, for example, to remove any errors, to normalize the data, and to edit data formats, etc. In case, the entity data is to be pre-processed, the data pre-processor 210 may accordingly implement a technique, based on a nature of the task/work. For instance, in case of claim processing, the data pre-processor 210 normalizes the obtained sensor data, which may implement one or more normalization techniques, such as Normalized weighted average data fusion (NWADF) technique. The sensor data may need to be normalized to factor in errors that may occur due to various reasons, such as illumination, variation in calibration of instruments, and instrument tolerances.

Upon normalization, the data pre-processor 210 may assimilate the normalized data to a risk control model or knowledge management model. The analysis includes upstream and downstream analysis. The data assimilation combines the background information with the current data observations, which leads to the numerical modeling or numerical analysis and forecast. In present case, during assimilation, the sensor data are modeled and predicted along with the background data with respect to the weather conditions, such as temperature, humidity, and sensor age while gathering the sensor data.

The assimilated data signifies the importance of internal and external conditions or factors that potentially impact the gathered data from the measurements. This kind of information may be critical and helpful in the upstream and downstream prediction/analysis, for instance, the sensor data could be totally different, even opposite, if the sensor data are gathered on different internal or external conditions. For example, the sensor reading data from the wind turbine probably are very different in the extreme cold winters to the extreme hot summers. Further, the built risk control models and management models may be stored in the database 115. In an example, the normalized data may be assimilated to the existing risk model and the created management model using an assimilation technique, such as weighted least-squares finite element method where the model composes the variables with different weighted factors obtained from computations.

The database 115 may include a model container, which is to store the trained and validated risk control models and management models. In an example, artificial intelligence methods, such as Lasso regression, random forest, and neural networks may be used for model creation. Take a property-vehicle risk control for example, the input variables include engine parameters, fuel rate, tire pressures, and surface cracks, etc. the output is the estimated risk of vehicle mechanical failures. After data processing and/or feature selections, the input data is plugged into the AI methods, such as lasso regression, which may not need feature selection), random forest, and neural networks for training by k-fold cross-validation or hold-on percentage train-test-validate methods, where the models are obtained with measured performance on the unknown data or testing data. Meanwhile, to avoid the model over fitting, the regulations or penalty parameters may be included as part of the model.

Further, to optimize the prediction results, the model selection methods are applied to pick up a single model or an ensemble model for the risk control and knowledge management tasks, where the model with optimized (the maximum, the minimum, etc.) performance measures such as the Akaike information criterion (AIC), Bayesian information criterion (BIC), and F1 measure is selected. The model corresponding to an instrument covering an entity or a bundle of entities is under consideration. The selected model(s) are stored in the database 115 to perform further risk control and knowledge management, where the storage format could be very different, for memory or space efficiency, only the selected variables and parameters are stored in some cases. To tune the performance, the AI or machine learning techniques such as, online learning, incremental learning and reinforce learning are used to keep the model(s) updated or rebuild on the fly promptly without information lags.

In addition to data assimilation, the data preprocessor 210 includes the functions of report generation, speech to text conversions, data mining, benchmarking databases, and performance benchmarking of techniques to conduct a wide variety of applications and usage. Thus, the data preprocessor 210 includes implementation of risk control and knowledge management intelligent analysis documents generation techniques, audio and video recognition and processing techniques, and performance benchmarking techniques to compare the performance measures such as accuracy, precision and recall, and computational efficiency from the time and space perspectives.

Moreover, the agent 135 also includes the implementation of benchmarked databases, and the performance benchmarking of the various techniques. For example, to benchmark the image processing techniques, the sliding window across the images with mean or median filters and other different filters may be used. The benchmark results may be based upon the performance of different image processing techniques on a standard benchmark database, such as ImageNet. Upon preprocessing, the risk control and knowledge management agent 135 handles the data from the data analyzer 130, where one or more components of the agent 135 may be invoked.

For example, when the notification generator 225 detects the threats of potential disasters, the alerts to the users may be generated proactively and the advices may be provided based upon the reasoning codes of threats and knowledge storage inference about how to react to certain scenarios. In this situation, the knowledge storage within database 115 includes the knowledge graphs, knowledge substrate, and knowledge bases. The notification generator 225 needs to use inference techniques to obtain the threats codes and inference solutions/advices, which may include intelligent questions and answer agent/advisor. The alert generator may include an AI dynamic advisor (not shown in figures), which may provide interpretation, prediction of the current and future state of the property, or other insured entities and clients.

In another example, claim processing invokes the claim processor 220. The claim processor 220 could include a similarity comparator and a damage estimator. The similarity comparator includes the analysis of the assimilated data on the entity 110 to identify a similar case from the risk control and knowledge management database 115. The notification generator 225 may also implement similarity comparator where the similarity comparator can retrieve and compute for example, handled historical proactive alarms and suggestions.

The artificial intelligence and machine learning techniques, such as case based learning techniques, could be used to obtain the reasoned threats codes and inference advices from the case or document similarity computations. Similarly, the claims settlements can be handled according to the similarity or independent inference from the settled claims and/or other related data regarding to the factors such as loss estimation, compensation resolutions, and service repair solutions.

Moreover, the similarity comparator includes implementation of similarity calculation techniques, such as cosine similarity and Jacob similarity to produce a case similarity number. In an illustrative implementation, the similarity comparator determines vectors corresponding to assimilated data and other data/cases in the risk control and knowledge management database 115. The assimilated data includes data, such as images, pertaining to the entity 110 before the claimed damage, images submitted by the users after the claimed damages, and images taken by the agents and field technicians.

The claims are handled by the techniques such as supervised learning, unsupervised learning, and semi-supervised learning based on entity type and damage type. For instance, clustering technique, which is a kind of unsupervised learning, is used in case of damages to a building wall, k similar claims are selected, and the claim processing was performed and settled based on the methods, such as similarity of one most similar claim, mean/median of the k similar claims, or the majority vote of the k similar claims. The techniques, such as latent dirichlet allocation, can also be used here.

Further, damage measure vectors are computed to indicate the damages to an entity(s) from different measurement parameters. The damage vector may be computed based on the comparison of assimilated data before and after the damages. Furthermore, a reference vector may be determined, which represents potential similar cases. The similarity includes measures the differences between the damage vector and each of the reference vectors, in the areas of such as distances, density, and angles. The case corresponding to a reference vector with highest similarity value may be selected as a potential similar case.

Moreover, a case similarity threshold may also be predefined, optimized by the cross validation, or trained by models, and the like, to ensure minimum level of similarity between the present case and a case identified as the similar case. When the similarity score of the potential similar case is greater than the similarity threshold, the potential similar case may be identified as the similar case for being used as a reference in claim processing, alerts generations, and advices productions of present case. Otherwise, no case may be identified to be similar to present case. Consider claimed damage repair cost estimation for example; the agent 135 obtains the repair or replacement price per unit, and the number of damaged units to compute the estimated payment to settle the claims.

The damage estimator includes the dynamic data trending analysis, prediction techniques, and AI techniques, to provide damage estimation and claim processing. In an example, the damage estimator includes the implementation of an ensemble learning technique to determine the damages estimation. Using case based reasoning techniques, the damage estimator may identify and obtain the claims data pertaining to the similar cases, where the claim data may include details of the damage, compensation paid, and settlement contracts, if any. Based upon the obtained data, the damage estimator includes the comparison of the damages between the present case with the damages in the similar cases, which is to provide an estimate cost of repair or replacement of the entity 110. It will be appreciated that, the damage estimator includes the condition factors of the entity 110, while providing a damage estimation.

In a scenario where no similar case is identified, the damage estimator within the agent 135 may provide a damage estimation of submitted claims, based on comparison of before and after damages. The damage estimation data may provide an estimation corresponding to various degrees of damages to an entity or multiple entities. The risk control and knowledge management is explained in detail with an example at FIG. 3, where the damage estimator extracts the case vector information, repair or replacement price per unit, the number of damaged units, and related entities information to obtain the damage estimation to settle the claims in communication with the claim processor 220.

Similarly, the notification generator 225 includes continuous prediction on assimilated data pertaining to various entities 110 or inferencing on receiving an external trigger. The notification generator 225 may obtain reference parameters corresponding to an entity 110, which may also be stored in the database 115. The reference parameters include the parameters that influence the occurrence probability of a damage to the entity 110, and respective tolerance threshold levels. Moreover, the notification generator 225 includes threats reason logic to alarm and inference techniques on knowledge storage to provide the guidance to react to the alarms.

The risk control and knowledge management agent 135 includes the notification generator 225, which is to determine if notifications are provided to users of the entity(s) 110 to prevent the entity(s) 110 from damages, or to minimize the damages proactively that may be caused, if a remedial measure is not taken, based on the comparison of the reference parameters. The notification generator 225 provides the alerts and advises via Internet of things (IoT) devices, which may be associated with the entity 110 and the system 105. If the damages are detected, the remediation executions are provided promptly if it is not fraudulent. The reference parameters include similar or different representations for various entity types. If the entity 110 is a bridge, the reference parameters may be vectors such as, depth of a crack, scope of the crack, and texture of an exterior bridge surface. In case the entity 110 is a vehicle, the reference parameters is a vector or matrix such as engine temperature, fuel rate, and a potential anomaly in a control unit of the vehicle.

In case the assimilated data indicates that a depth of a crack in a building wall is exceeding a threshold, the notification generator 225 provides a notification(s) to generate an alert to inform users of the potential damages proactively and direct the users what kind of preparations should be done. In another example, the alert and advice may be required an approval or several levels of approvals to provide the notifications, such as an underwriter or a field technician, who has visited the damage site(s).

To control the risks and manage knowledge, the risk control formulizer (RCF) 230 may be invoked within the intelligent agent 135. As mentioned earlier, formulization of an RCF includes, such as, identifying emerging risk markets, developing new RCF or knowledge management instruments, and reviewing existing RCF(s).

To identify the emerging risk markets, a RCF 230 develops a formulizer to extract from the data analyzer 130 about information, including the entity data within one or more domains, such as entity categories (e.g., property, vehicle, or an appliance), location/territory, and weather. The entity data may include details pertaining to the entities and their environment. The RCF 230 includes the implementation of dynamic AI data analysis techniques, which is with the functions such as, to identify fraudulent areas, predict risk trending, and recognize the emerging risk markets with high probabilities of demands comparing to the thresholds, in the areas including cyber, climate, nanotechnology, self-diving cars, and drones.

Moreover, the emerging risks may be identified based on the sensor and the historical and monitoring data. Take the climate for example, the entity data may include climate details regarding to rainfall, flooding, and earthquakes. The RCF 230 includes the implementation of the AI techniques, such as outlier detection technique like weighted one class SVM, clustering, etc., to identify the emerging risks and emerging markets. In trending analysis, it appears that volume of rainfall from the sky has been heavily increased over time, which in turn may affect the entities, such as property and vehicles. Simultaneously, the RCF 230 identifies the protection against the damages caused by rainfall as a new emerging market, where the corresponding products may be created. The output of the RCF 230 communicates within intelligent agent 135, which including to provide to internal and external agents for further usages.

The RCF 230 includes the assistance in reviewing existing RCFs, for instance, the RCF 230 processes the entity data to develop the pricing at the demand of usage by Internet of Things. In addition, the RCF 230 includes the model training and validation, such as lasso regression model or linear model to control the risks by analyzing various internal and external associated factors. The output of RCF 230 may be provided to an external agent to determine if it is necessary to update or replace the existing RCF.

The intelligent risk control and knowledge management agent 135 includes AI dynamic advisor (not shown in figures) to companies, an AI agent assistant (not shown in figures), an AI user dynamic assistant (not shown in figures). For example, the AI assistant provides damage evaluation report to field technicians based on the damage images storage within database 115, comparison, and loss estimation. The input to the AI assistant includes text, speech, and video from the technicians and users about the damages and submitted claims. The related functional components are invoked, such as the external agent assistant 235 which potentially include the intelligent diagnosis and repair system; and AI assistant to agents which potentially include the domain expert reasoning system, and video/speech/text processing techniques to handle the interactions among agents, agent assistants (e.g., technicians), and users.

Moreover, the entity data pertaining to the risk control and knowledge management covering the entity may be processed by the external agent assistant 235. The entity data may indicate contents of the risk control and knowledge management, such as risk control models, policies, and contracts of a variety of entities and various users. As illustrated earlier, the entity data may be gathered by the data analyzer 130. In present example, the entity data may be provided in form of rules by the data analyzer 130.

The AI dynamic user assistant within intelligent risk control and knowledge management agent 135 provides GUI or APP for the users or the risk controllers, which is to provide the customized experience. The AI dynamic assistant to users include the fraudulent claim detection and alert, where AI techniques, such as outlier detection methods, are used; coverage and premium product search and recommendation, where the AI techniques, such as PageRank, Matrix Factorization, and Deep Neural Nets are implemented; live streaming advices and suggestions based upon clients' history and the monitoring senor data, where AI techniques such as Online Learning with Matrix Factorization, Deep Neural Networks are applied; and AI enabled policies and contracts renewal, upgrades, and promotions, where the items in policies and contacts are like rules, the Natural Language Processing and Information retrieval techniques (such as conditional random fields), including entity extraction, entity resolution, entity categorization, and inference techniques can be applied.

The AI agent assistant includes the domain expert reasoning system, and video/speech/text processing techniques to handle the interactions among agents, agent assistants (e.g., technicians), and users. The inference and reasoning are achieved from the Natural Language Processing (NLP) and Information retrieval techniques, such as Random Forest and Decision Trees. The inference provides the assistance to the internal and external agents in the areas, such as risk control modeling, updating terms and conditions of policies, determining compensations, upgrading a user, and resolving the users' disputes. Moreover, the renewing of policies and contracts are explained in technical details by an example with reference to description of FIG. 4.

The agent 135 includes the functions to predict and categorize risks of quotes corresponding to a user request. It implements the AI techniques, such as Random Forest, Lasso Regression, and Deep Neural Network to produce the quotes based on user historical data and or monitoring sensor data if available. The risks includes various levels, such as high risk, medium risk, and low risk, where multi-class classification methods are used. For instance, a user (e.g., a property maintenance and patrol group) would like to protect a bridge with the historical attributes data, such as damage frequencies, damage claims, and damage compensations, and the damaged images caused by reasons such as natural disasters, technical failures, and maintenance errors. The application of a bridge with high frequencies of heavy damages is very likely to be rejected by the agent 135, while the application of a bridge with no or only a few measurable damages has a higher chance of acceptance by the agent 135. The agent 135 rejects an application of a user, if the risk is high after computation. The application is accepted and evaluate premium by the agent 135, if it is ascertained that the risk is low. In case the risk is medium, the AI agent assistant conducts the evaluation of the application to determine if it is within the maximum liabilities limit. If it is within the maximum liabilities limit, the application is accepted, else rejected. When the user's application is accepted, the AI assistant to agents 260 includes the estimation and prediction of the risk premiums by using AI or machine learning techniques, such as random forest, lasso regression, and deep neural network.

The AI agent assistant to agents includes the assistance to build and select appropriate risk models and policies to the agents, where the AI techniques, such as PageRank, Matrix Factorization, and Deep Neural Nets, are implemented and the entity data obtained from the data analyzer 130 is processed. Moreover, in said case, the entity data may include client profile, which may be analyzed by the data analyzer 130 to identify profiles of other similar clients (similar case). The AI agent assistant may be used as a tool for agents to conduct model creation and selection to control risks to determine the details, including the acceptance or reject of the users' applications, claim adjudications process, and products and coverage selections to the users.

Moreover, the risk control and knowledge management model is built based upon features/variables in various related categories with different weights, such as property attributes, economic variables, and interact relations factors. While building models and managing the risks, it is critical to avoid making any wrong assumptions, such as assuming that the better financial variables or economic variables may contribute to control the risks, while the opposite may be true that they may have negative coefficients and may have adverse or bad effects. The table 1 as shown below is an example of input features or variables of the risk control and knowledge management model, which may even include the financial risk and political risk factors.

TABLE 1

Input features/variables of risk control and knowledge management model

| Property Attributes | Economic variables (of the property industry) | Interact relations factors |
|---|---|---|
| Historical damage frequencies and ratio | GDP growth rate | Years of customer relations |
| Damage claim compensation | Tax rate | Customer loyalty |
| Aging rate | Economy stability index | Claim settlement and dispute frequencies |
| Maintenance costs | ICRG economic rating | Claim dispute ratio |
| Repair costs | Moody's credit risk rating | Customer feedback history |

Moreover, the AI agent assistant may be also used to compare or verify an external agent assistant's evaluation, for instance, a field technician's evaluation. The AI agent assistant may convert field technical evaluation and the user's claims to the text. The field technician's evaluation and user's claim may be inferenced, estimated, or learnt from the entity data. Moreover, the external agent assistant 235 includes the implementation of comparison and dispute AI assistant including document similarity methods, such as term frequency-inverse document frequency (TF-IDF), topic modeling, latent dirichlet allocation, and deep neural networks, to measure the document similarity to draw the conclusion weather the user's claims are settled or the disputes remain between field technician and user. The AI agent assistant includes the generation of user claim settlement evaluation report to verify the external agent assistant's evaluation, too. Moreover, as an example table 2 shows, the field technician's report and the user's claim document:

TABLE 2

Comparison of field technician's report and user's claim document

| Field Technician's report | User's Claim Document |
|---|---|
| ID: 12345 | ID: 12345 |
| Property type: Building | Property type: Building |
| Damage Scope: 200 square feet | Damage Scope: 205 square feet |
| Damage Scale: 600 square feet | Damage Scale: 600 square feet |
| Damage Depth: 50 square feet | Damage Depth: 50 square feet |
| Potential Costs: $2M | Claimed Losses: $2.2M |
| Alert: Damages identified | Claimed Requirements: Please repair. |
| Advice: Repair within 3 months | Damage Photos: See the attachment |

The two documents may be provided by the data analyzer 130 and the agent assistant 235 may compare the available documents to determine a report similarity scale or score using document similarity methods. Based on the analysis, the agent assistant 235 may provide a user claim settlement evaluation report. The user claim settlement evaluation report includes the report similarity score indicator of an extent of the similarity between the agent assistant's report and the user's claim document.

To measure the report similarity score to the similarity threshold, it may be ascertained whether the claim is settled. The methods to determine similarity threshold include pre-defined threshold, threshold optimized by the cross validation, and threshold trained by models. For instance, if the report similarity score is greater than the similarity threshold, it may be ascertained that the claims are settled and there is no dispute between the evaluation performed by the external agent assistant and the claims submitted by the user. Otherwise, disputes remain and wait to solve in next round settlement. An example of user claim settlement evaluation report is shown in the below table 3, which is generated from the documents (Field Technician's report and User's Claim Document) provided in previous example.

TABLE 3

User claim settlement evaluation report

ID: 12345
Property type: Building
Similarity Measures (for various factors)
  Damage Measure: *****
  Damage Loss Payment: *****
  Claimed Requirement: *****
Claim Settlement Conclusion: Settled The intelligent risk control and knowledge management agent 135 may also provide for prediction and interpretation of claims, including the claims or knowledge submitted by users, produced by agents, or generated by agent assistant. The implementation is based on AI techniques to process the speech, video, or text of the entity data, which may include conversations between an agent assistant and the user claiming compensation for damages, in audio, video, or text format. Moreover, the component 235 may implement conventional neural networks or deep neural networks for the video and speech processing and produce Word-Embedding and N-Gram for text processing.

Upon the damage evaluation and analysis, as illustrated in pervious paragraphs with respect to claim processing, the agent assistant 235 includes a function of generating a damage evaluation report. The damage evaluation report may provide real time detection of fraudulent claims, for instance, using outlier detection AI techniques. The information such as loss estimation, alerts, and repair advices may be included in the damage evaluation report as illustrated previously.

In the present disclosure, the system 105 attempts to perform a variety of risk control and knowledge management tasks to reduce errors and minimize manual interventions. The data analyzer 130 and the intelligent risk control and knowledge management agent 135 implement a variety of AI and machine learning techniques to process and intelligently infer knowledge from data sources, such as sensors and databases. The system 105 controls the risks and manages the knowledge as efficiently as, relevant data is obtained from sensors associated with entities, which reduces errors that may introduced by external factors. Further, the entity data may be further process the entity data using appropriate AI techniques to perform risk control and knowledge management tasks efficiently. Moreover, this way, resources (computational and manual) may be better utilized and the system 105 may be cost-effective and time-effective. Further, the system 105 efficiently manages knowledge gathered from various IoT devices and/or sensors. The gathered knowledge is stored in database 115 to access to control the risks. Further, the system 105 provides a mechanism to efficiently manage knowledge pertaining to various tools/instruments and associated contracts and policies to identify new markets and reviewing the existing ones.

Figure 3A:
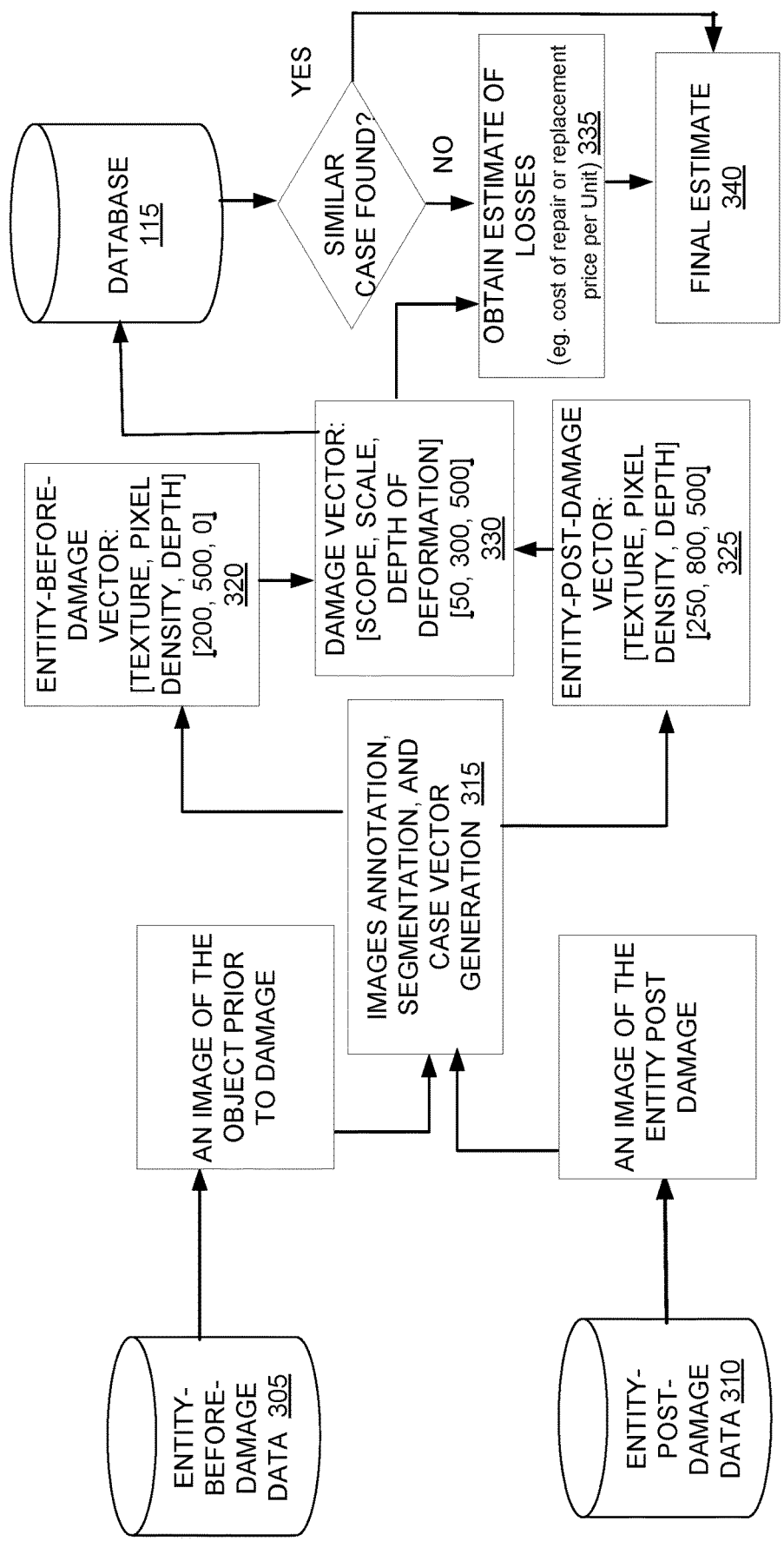
FIG. 3A and FIG. 3B illustrate an example claims processing, according to an example of the present disclosure.
Figure 3B:
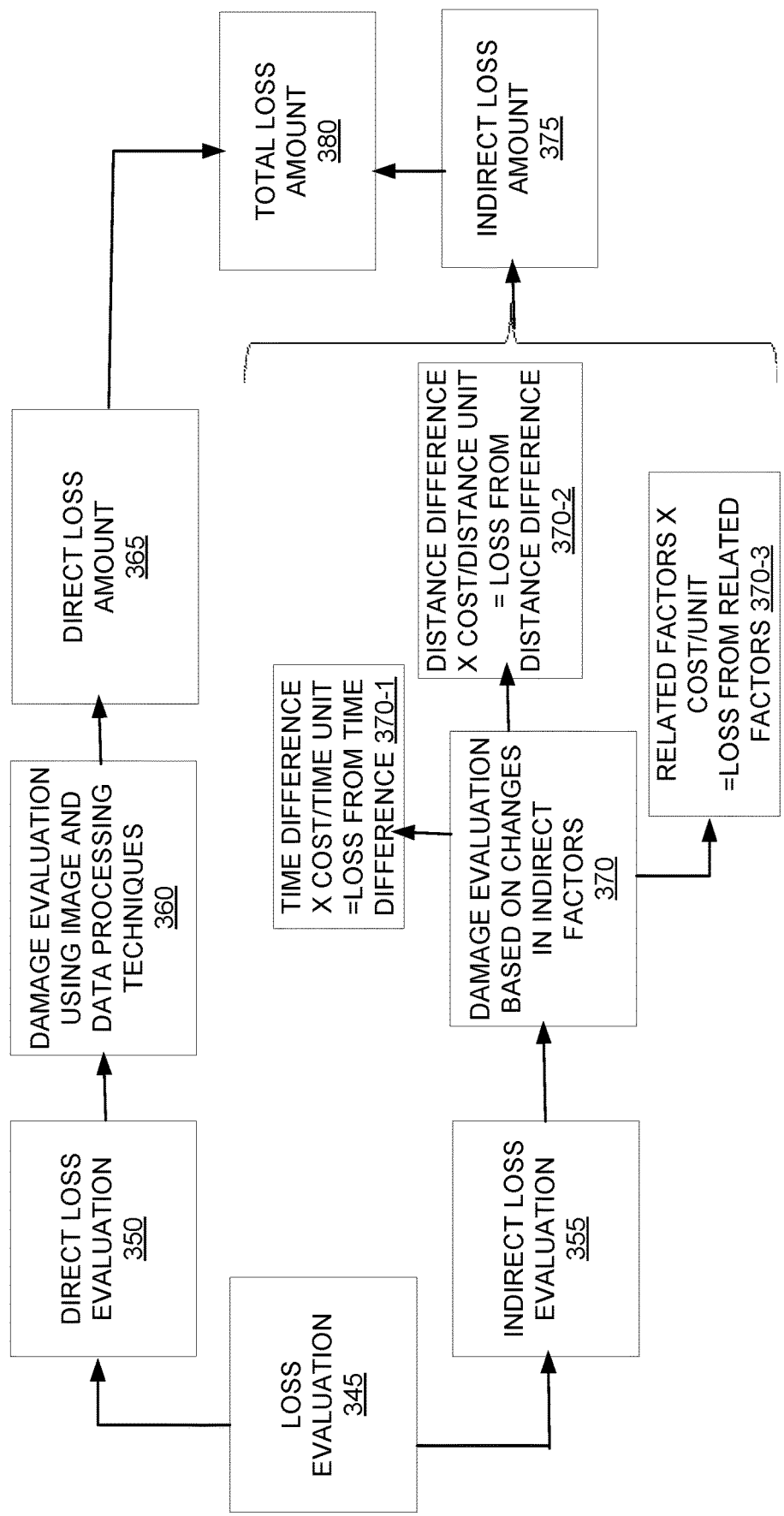

FIGS. 3A and 3B show how to extract the case vector information, estimate damage loss, and process the claims, according to an example of the present disclosure. Take a damaged bridge for example, entity-before-damage data 305 includes the bridge images before the damages, where the images are taken from different angles, distances, and heights, etc. The entity-before-damage data may be obtained over querying an ID associated to the covered entity from the risk control and knowledge management database 115. When a risk control or management task is related to a specific ID, entity-before-damage data associated to this ID may be obtained. Similarly, the entity-post-damage data 310 may be obtained, where the entity-post-damage data includes the bridge images after the damages and the images are pictured at different angles, distances, and heights, etc.

The entity-before-damage data 305 and the entity-post-damage 310 include data obtained from various sensors and data obtained from the data analyzer 130, where the entity-before-damage data 305 and the entity-post-damage 310 may be stored in the risk control and knowledge management database 115 separately.

Subsequently, as indicated at block 315, the intelligent risk control and knowledge management agent 135 processes the entity-before-damage data 305 and the entity-post-damage 310 to annotate images and segment images, and to generate vector, such as damage vector, as illustrated in description of FIG. 2. In an example, at block 320, an entity-before-damage vector corresponding to images before damage may be generated. The vectors may correspond to texture, pixel density and depth. While at block 325, an entity-post-damage vector corresponding to images after damage may be generated. The entity-before-damage vector and entity-post-damage vector may then be processed to provide damage vector at block 330. The damage vector may be indicative, which includes damage scope, damage scale, and depth of deformation.

Next, the intelligent risk control and knowledge management agent 135 includes the loss estimation, where the detailed total loss estimation is explained with reference to description of FIG. 3B. When performing the loss estimation, AI techniques such as unsupervised learning are used to cluster the similar cases from the inputs, which are stored in the risk control and knowledge management database 115. If a similar case is identified, final damage estimation may be done, based on the similar case(s) and the estimation done at block 335. Otherwise, loss or damage estimations are done at block 335 by invoking and leveraging the capabilities of intelligent risk control and knowledge management agent 135.

In details, if the similar cases are identified, various computational intelligence methods, including the statistical indexes (such as mean, median, mode) and majority vote, are applied to determine the final damage estimation value at block 340. Otherwise, the intelligent computation based on the number of damaged units and repair or replacement cost per unit from agent 135 and block 335 are done, and the result is the final damage estimation value at block 340.

In FIG. 3B, the block 345 includes the loss evaluation for damages to a property, such as building, bridge, and land. The damage estimation includes direct loss estimation as indicated at block 350 and indirect loss estimation as indicated at block 355. For direct loss estimation, entity data may be obtained from the sensors 120 and data analyzer 130. The entity data may include such as images of damaged properties with visible cracks and yielding cracks. Further, damage evaluation for direct loss may be computed using techniques, such as image processing and data processing techniques as indicated at block 360. Subsequently, at block 365, the direct losses may be computed, based on an extent of damage using damage vector, as explained earlier.

At block 370, changes in indirect factors that may influence pricing are considered for indirect loss estimation, where the indirect factors include but not limited to travel time, distance, and oil and gas prices, etc. At block 370-1, loss due to time difference are factored in, at block 370-2, loss due to distance difference are factored in, and at block 370-3, loss from other related factors that may relevant are factored in. Subsequently, at block 375, indirect loss may be computed or unified based on information fusions. The direct and indirect loss amount may be united at block 380 to determine the total loss amount. The damage estimation may be done by the intelligent risk control and knowledge management agent 135.

Figure 4:
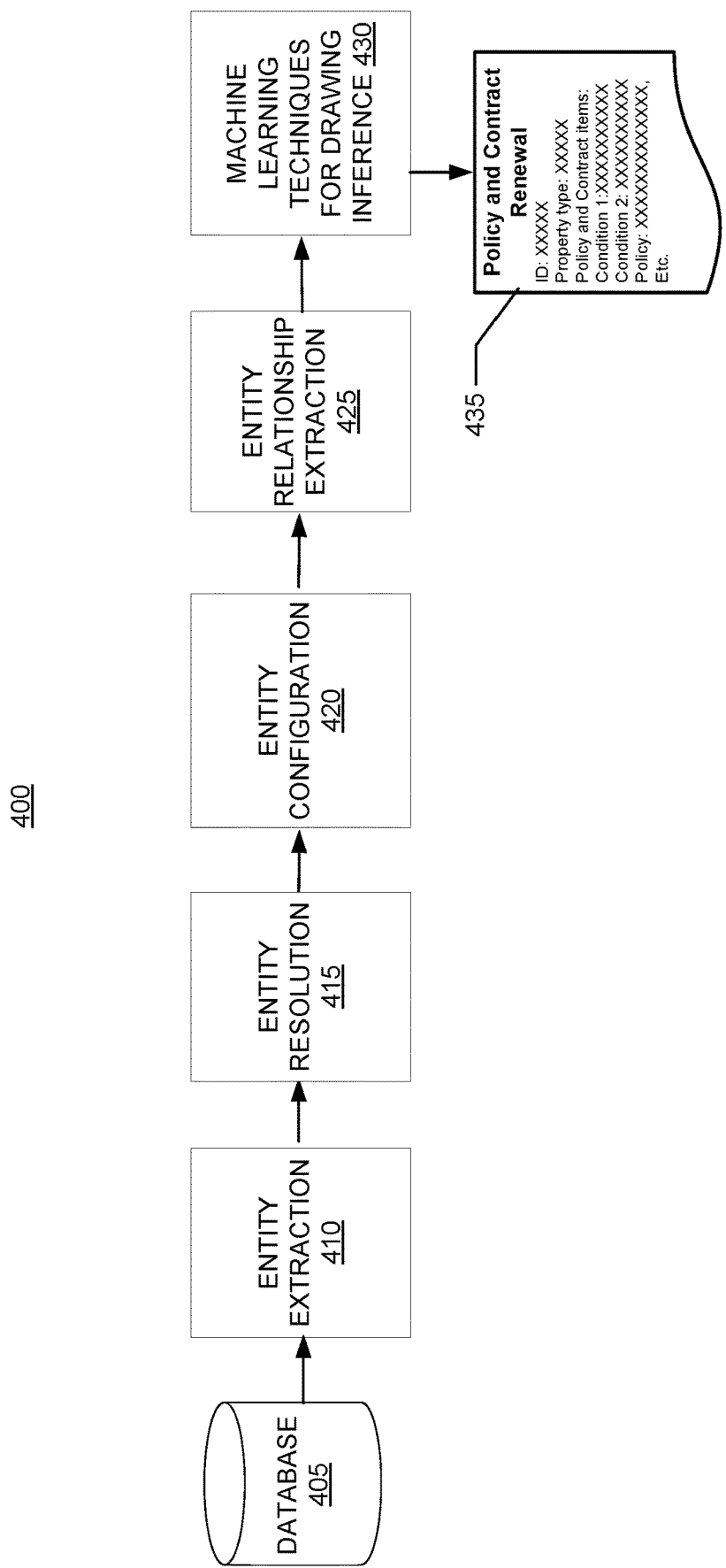
FIG. 4 illustrates an example risk management instrument renewal process, according to an example of the present disclosure.

In FIG. 4, it illustrates an example of the underlying AI techniques of knowledge discovery and policy understanding, which serve as the technical foundations in the areas of such as policy and contracts renewal, upgrades, and promotions, according to an example of the present disclosure. As illustrated, at block 400, entity extraction 410 may be performed from a database 405, such as the risk control and knowledge management database 115, which is to identify the entities across the documents including, for instance, metadata of the entity, such as entity type and entity ID, and metadata of the users. At block 415, after recognizing the entities and identifying their values, entity resolution is applied across the documents to resolve the entity conflicts or multiple names that refer to the same entity. In an example, the extracted entities, such as "Apple" and "Apple Inc.", "Banana" and "Banana Republic", can be distinguished as "Apple is a fruit name", "Apple Inc. is a company name", "Banana is a fruit name", "Banana Republic is a company name" by entity resolution techniques. In another example, the extracted entities, such as "Donald Trump", "Donald J. Trump", "President Trump", can be recognized as the same entity in a resolved form, Donald Trump.

At block 420, the extracted entities are processed by entity categorizers or configurations, which are to categorize the entities into corresponding categories (including location, person name, organization name, etc.). A category may be descriptive of an entity type. The entity categorization may include classification or cluster of entities in various categories. At block 425, entity relationship extraction may be performed, where the entities relations may be identified by phrases, such as "is insured by", "Is a subcategory of", etc. In an example, Natural Language Processing techniques and Information retrieval techniques, including supervised learning, unsupervised learning, and semi-supervised learning, such as conditional random fields, may be used for entity extraction, entity resolution, entity categorization, and entity relationship extraction.

After entity relationship extraction at block 425, the entities and the entity values that are extracted are categorized can be stored in one or more data structures, which enable to construct knowledge storage (including knowledge graphs, rules, and models) and sit in risk control and knowledge management database 115.

At block 430, artificial intelligence and machine learning techniques, such as inference techniques, causality reasoning, and hidden knowledge refinery, may be implemented to the identified relationships to understand the policies and contracts, to obtain the hidden rules and govern the policies and contracts renewal, upgrades, and promotions by underlying risk control models and recognized hidden management rules. The updated policies and contracts may be in turn to provide feedbacks to enrich the knowledge storage in the form of, such as knowledge graphs, rules, and models by reinforcement learning. The rules may be updated and renewed by techniques, such as random forest, decision trees, and other rule learning methods. Further, the specific number in the contract, for example, the coverage under a specific condition is predicted by Lasso regression techniques or other AI techniques. For instance, upon the analysis of property history and customer values, certain terms and conditions of the risk control and knowledge management policies/contracts may be revised, premium may be changed, and the risk control models for a user may be upgraded, and a related coverage may be promoted to the user. As an output that shown at block 435, a renewed risk control and knowledge management document may be provided. Moreover, new or related products may be recommended to users based on using AI techniques, such as, pagerank, matrix factorization, and deep neural networks.

Moreover, in an example implementation, the data analyzer 130 includes entity data with details of various risk control and knowledge management instruments/tools for various entities and users. The intelligent risk control and knowledge management agent 135 may then process the entity data, as illustrated previously, to renew a risk control model and/or to recommend a new risk control or knowledge management tool to a user.

Figure 5:
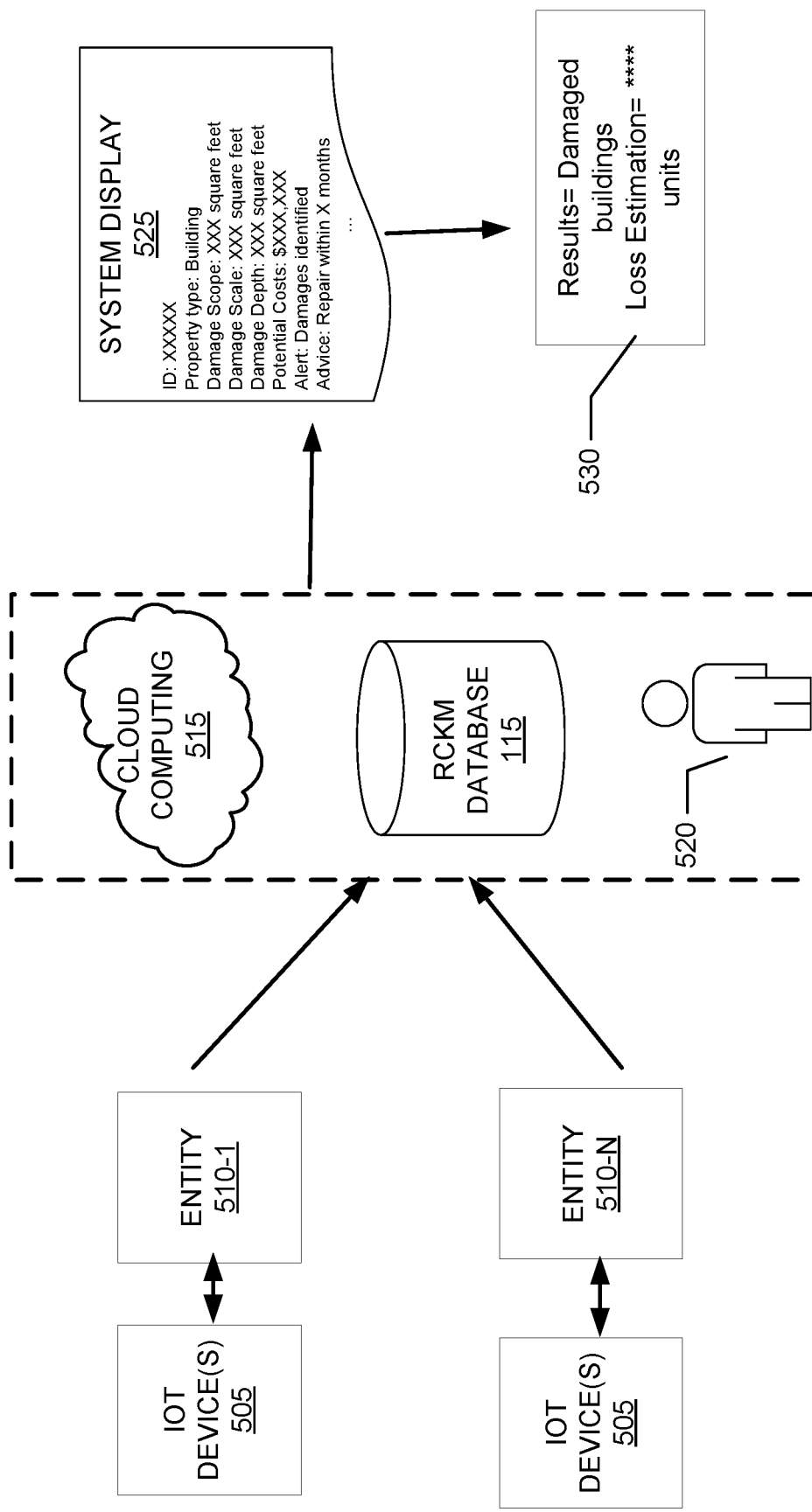
FIG. 5 shows an example of Internet of things (IoT) and AI based risk and knowledge management analysis, according to an example of the present disclosure.

Over FIG. 5, it illustrates an example of Internet of things (IoT) and AI based risk management analysis, according to an example of the present subject matter. As can be observed, using the sensors 120 and IoT devices 505 data pertaining to entities 510-1 . . . 510-N may be gathered. Consider an example, where the entity 510-1 may be a building and the entity 510-N may be a vehicle. For the entity 510-1, the data may be gathered and AI based risk control may be performed for, for example, energy management and fire safety. Likewise, for the entity 510-N, the data may be gathered and AI based risk management analysis may be used for, for instance, performance monitoring and monitoring battery, engine, or fuel, etc. The gathered data may be extracted by data analyzer 130 over the cloud 515 and stored in the database 115. In other examples, techniques other than cloud computing may be used, such as Frog computing, Edge computing. Further, as explained, the gathered data may be analyzed using AI based techniques by AI agent assistant and the notification generator 225 of intelligent risk control and knowledge management agent 135.

Moreover, an agent assistant 520, may also receive the data to be assisted for accurate and efficient evaluation. Based on evaluation performed by the agent 520 and the system 105, loss and damage estimation may be performed and displayed as depicted at display 525. The display 525 may indicate ID, alerts, advices, details of damage such as damage scope, damage scale, damage depth, and potential costs, which has similar functions as the notification generator 225 while these functions are to assist agent assistant to provide the repair and replace services. This analysis result 530 may be provided to agents for further processing.

Figure 6:
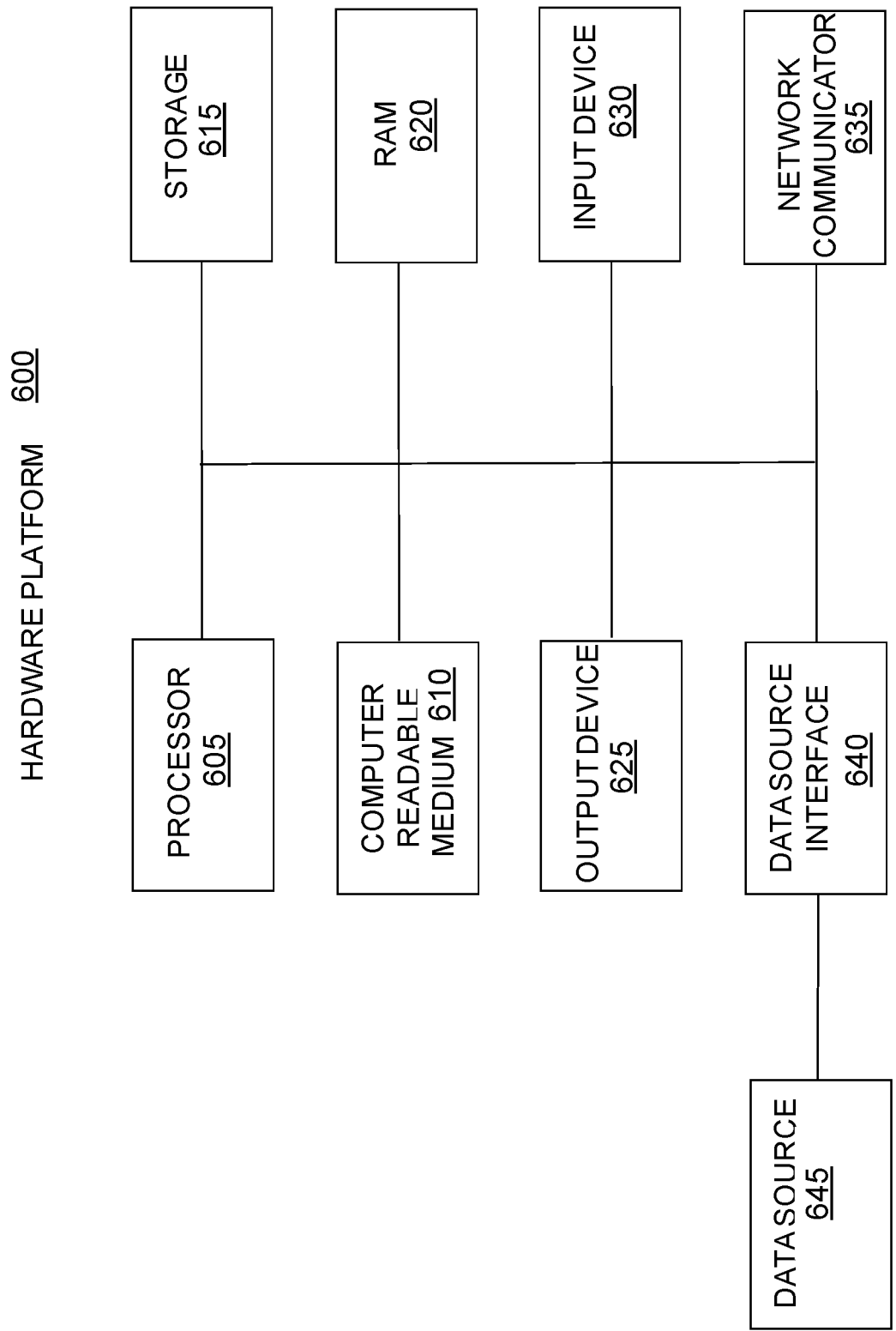
FIG. 6 illustrates a hardware platform for implementation of the system, according to an example of the present disclosure.

FIG. 6 illustrates a hardware platform 600 for implementation of the system 105, according to an example of the present disclosure. Particularly, computing machines such as but not limited to internal/external server clusters, quantum computers, desktops, laptops, smartphones, tablets and wearables which may be used to execute the system 105 or may have the structure of the hardware platform 600. The hardware platform 600 may include additional components not shown and that some of the components illustrated may be removed and/or modified. In another example, a computer system with multiple GPUs can sit on external-cloud platforms including Amazon Web Services, or internal corporate cloud computing clusters, or organizational computing resources, etc.

Over the FIG. 6, the hardware platform 600 may be a computer system 600 that may be used with the examples illustrated herein. The computer system 600 may represent a computational platform that includes components that may be in a server or another computer system. The computer system 600 may execute, by a processor (e.g., a single or multiple processors) or other hardware processing circuit, the methods, functions and other processes illustrated herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory). The computer system 600 may include a processor 605 that executes software instructions or code stored on a non-transitory computer readable storage medium 610 to perform methods of the present disclosure. The software code includes, for example, instructions to gather entity data, process entity data, and perform risk control and knowledge management functions, such as risk model training, claim processing, and RCF formulations. In an example, the data analyzer 130 and the intelligent risk control and knowledge management agent 135 are software codes or components performing these steps.

The instructions on the computer readable storage medium 610 are read and stored the instructions in storage 615 or in random access memory (RAM) 420. The storage 615 provides a large space for keeping static data where at least some instructions could be stored for later execution. The stored instructions may be further compiled to generate other representations of the instructions and dynamically stored in the RAM 620. The processor 605 reads instructions from the RAM 620 and performs actions as instructed.

The computer system 600 further includes an output device 625 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 600 further includes input device 630 to provide a user or another device with mechanisms for entering data and/or otherwise interact with the computer system 600. The input device may include, for example, a keyboard, a keypad, a mouse, or a touchscreen. In an example, output of the intelligent risk control and knowledge management agent 135 is displayed on the output device 625. Each of these output devices 625 and input devices 630 could be joined by one or more additional peripherals.

A network communicator 635 may be provided to connect the computer system 600 to a network and in turn to other devices connected to the network including other clients, servers, data stores, and interfaces, for instance. A network communicator 635 may include, for example, a network adapter such as a LAN adapter or a wireless adapter. The computer system 600 includes a data source interface 640 to access data source 645. A data source is an information resource. As an example, a database of exceptions and rules may be a data source. Moreover, knowledge repositories and curated data may be other examples of data sources.

Figure 7:
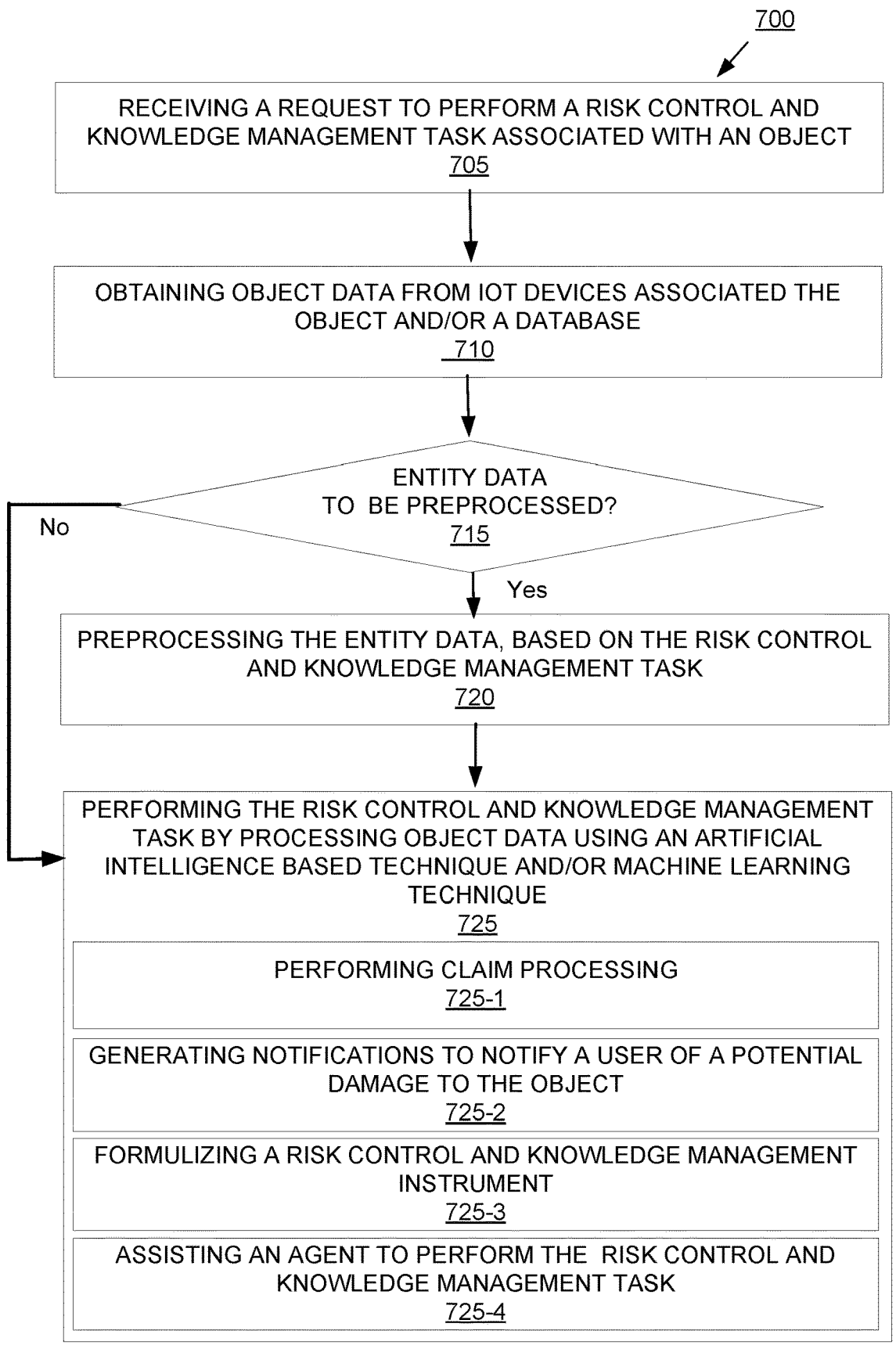
FIG. 7 illustrates a computer-implemented method showing functionality of the system according to an example of the present disclosure

FIG. 7 illustrates a device based implementation method 700 depicting functionality of the system 105, where the device includes but not limited to computers, mobile phones, and quantum computers, according to an example of the present disclosure. For the sake of brevity, construction and operational features of the system 105 which are explained in detail in the description of FIG. 1, FIG. 2, FIG. 3, FIG. 4, FIG. 5 and FIG. 6 are not explained in detail in the description of FIG. 7.

At method block 705, the method 700 commences with receiving a request to perform a risk control and knowledge management task associated with an entity, such as risk control model creations, claim processing, risk control formulizer, alerts and advices generation, and assisting users, agents, and companies. In an example, the data analyzer 130 and the system 105 may receive the request.

At method block 710, based on the risk control and knowledge management task, the entity data may be obtained from IoT devices, such as sensors 120 and/or a database, such as the risk control and knowledge management database 115. The entity data may include entity-before-damage data 305 and entity-post-damage data 310 pertaining to the entity, data pertaining to environmental attributes associated with the entity, and/or details pertaining to the risk control and knowledge management associated with the entity.

At method block 715, it may be ascertained whether the entity data is to be pre-processed prior to performing the risk control and knowledge management task. For instance, in case of claim processing, notification (alerts and advices) generation, preprocessing may be required; while in case of renewing a risk control model and management tool, pre-processing may not be required. Thus, upon the task to be performed, it may be ascertained if preprocessing may be required. In case it is ascertained that pre-processing is required, the method 700 may proceed from method block 715 to the next method block 720, otherwise the method 700 may proceed to the method block 725.

At method block 720, the entity data may be preprocessed. For instance, the entity data may be normalized using a normalization technique, such as, NWADF technique. The normalized data may be assimilated to a risk control model corresponding to the risk control and knowledge management instrument using an assimilation technique, such as weighted least square finite element technique. In an example, the data extraction and preprocessing may be performed by the data analyzer 130 of the system 105.

At block 725, the risk control and knowledge management task may be performed by implementing artificial intelligence techniques and/or machine learning techniques. In an example, the intelligent risk control and knowledge management agent 135 of the system 105 may perform the task of controlling the risks and managing knowledge.

Moreover, at block 725-1, claim processing may be performed. To perform the claim processing, an entity-before-damage vector and an entity-post-damage vector may be determined corresponding to the entity-before-damage data 305 and entity-post-damage data 310 corresponding to the entity. The entity-before-damage data 305 and entity-post-damage data 310 may include, for instance, images of the entity prior to and after damages. Based on the entity-before-damage vector and the entity-post-damage vector, a damage vector indicative of the damages to the entity may be computed. Using the damage vector, a case from the database having similar damage vector may be identified. Loss estimation of the similar case may be considered, while performing claim adjudication to the entity.

At block 725-2, notifications may be generated to alert and/or advise the users of existing and potential damages to the covered entities, and to provide advices on how to react to the alerts and damages. The potential damage to the entity may be identified proactively, based on processing of the entity data with respect to the reference parameters corresponding to the entity. The reference parameters are the parameters or factors that influence a probability of damage to an entity. The reference parameters may include threshold levels beyond which probability of damage to the entity may be greater than a threshold which may be predefined, trained by the models, or optimized by the cross validation. Upon identifying the potential damage and its probability is above the threshold, an alert may be generated to notify the users and provide advices on how to react to the alerts and damages. In an example implementation, the alert alarms and the advice notifications may be provided through an IoT device associated with the entity(s).

At block 725-3, the entity data may be processed to formulize a risk control and knowledge management instrument. For instance, the entity data pertaining to the multiple domains, such as location, entity type, and climate, may be processed to determine a probable demand for a new risk control model or a knowledge management instrument in future. When the probable demand in a domain is greater than a threshold, the domain may be identified as an emerging risk and/or an emerging risk market to formulate new risk control models and/or new tools to cover the emerging risk markets. In another example, relationships between the external factors, such as price and demand, associated with the risk control and knowledge management instruments may be determined to review the risk control models and management tools.

Moreover, at block 725-4, assistance to an internal or external agent may be provided. In an example, a similarity between a report from an external agent or agent assistant on claim settlement and the documents submitted by the user may be determined to provide a report similarity score. Further, a user claim settlement evaluation report may be generated to verify an external agent's evaluation to ascertain whether the claims are settled.

In another implementation, conversations between an internal/external agent, an external agent assistant, and a user corresponding to at least one entity may be processed, which includes but not limited to the conversations in audio, text, and video formats. Further, fraudulent claims may be identified based on the processing of the conversations and claim processing.

In another example implementation, the risk control tool includes the function of assessing the risk associated with a quote provided by a user. Moreover, an application by the user for the risk control and knowledge management tool may be processed, based on the assessed risks in various areas such as economical risks, financial risks, and credit risks. Therefore, the application may be accepted or rejected, based on the associated risks assessment.

What has been illustrated and illustrated herein are examples of the present disclosure along with some of its variations. The terms, descriptions and figures used herein are set forth via illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A system comprising:
a data analyzer to provide entity data pertaining to an entity covered by a risk management instrument models, based on a risk control and management task to be performed, the entity data being obtained from at least one of an Internet of Things (IoT) device associated with the entity and a risk control and knowledge management database, wherein the entity data includes one or more of, entity-before-damage data and entity-post-damage data pertaining to the entity;
data pertaining to environmental attributes associated with the entity;
details pertaining to the risk control and management associated with the entity, a user associated with the entity, and external related data associated with multiple entities and multiple users;
and live data associated with covered entities, the live data being gathered using remote sensing and IoT monitoring;
and an intelligent risk control and management agent in communication with the data analyzer, wherein the intelligent risk control and management agent is to process the entity data using at least one of an artificial intelligence technique and a machine learning technique to perform the risk control and knowledge management task, the intelligent risk control and management agent comprising at least one of, a claim processor to assist in claim processing pertaining to the entity, wherein the claim processor is to perform at least one of:
identify a case similar to the entity from a risk management database, using a similarity computation technique, the similar case having a case similarity score within a predefined threshold;
and compute a loss estimation, based on claims settled in the similar case;
a notification generator to generate notifications to the users, the notifications comprising one of alerts to notifying the users of existing and potential damages to the covered entities, and advice on how to react to the alerts and existing and potential damages, wherein the notification generator is to perform at least one of, identify the existing and potential damages to the entity, based on processing of the entity data with respect to reference parameters corresponding to the entity, the reference parameters influencing a computational intelligence measure of a damage to the entity by the artificial intelligence techniques;
generate the alerts to notify the user of the potential damage, when the potential damage is identified;
and provide the advices to how to react on the alerts to prevent the potential damage;
a risk control formulizer (RCF) to process the entity data to formulize the risk management instrument, based on at least one of the entity data in a plurality of domains and a relationship between various external factors associated with the risk management instrument, wherein the risk control formulizer is to identify emerging risk markets, develop new risk management instruments, and review existing risk management instruments;
and an agent assistant to process the entity data and related data to supplement the risk control and management task performed by one of an external agent, a user, and an organization providing risk management instruments.

2. The system as claimed in claim 1, wherein the data analyzer further comprises a data preprocessor, wherein the data preprocessor is to perform at least one of:
normalize the obtained data using a normalization technique; and
assimilate normalized data to a risk control model I using an assimilation technique, to provide the entity data.

3. The system as claimed in claim 1, wherein the claim processor is to perform at least one of,
determine an entity-before-damage vector and an entity-post-damage vector corresponding to the entity-before-damage data and the entity-post-damage data respectively, the entity-before-damage data and the entity-before-damage comprising an image of the entity;
compute a damage vector indicative of damage to the entity, based on the entity-before-damage vector and an entity-post-damage vector;
identify the case similar to the entity from the risk control and knowledge management database, based on the case similarity score of a vector representing the similar case with respect to the damage vector, the case being identified as the similar case, when the case similarity score is greater than a predefined threshold; and
provide an estimate of loss, based on compensation for damages provided in the similar case.

4. The system as claimed in claim 1, wherein the agent assistant is to:
determine a similarity between an external agent's report on claim settlement and a user's claim document to provide a report similarity score; and
generate a user claim settlement evaluation report to verify an external agent's evaluation, the user claim settlement evaluation report including the report similarity score indicative of an extent of similarity between the external agent's report and the user's claim document.

5. The system as claimed in claim 1, wherein the agent assistant is to:
process interactions between an external agent and a user corresponding to the entity; and
identify a fraudulent claim, based on the processing of the agents related interactions and claim processing performed by the claim processor; and
enable Artificial Intelligence based knowledge including at least one of a policy, a contract renewal, an upgrade, a search, and a promotion.

6. The system as claimed in claim 1, wherein the agent is to perform at least one of:
generate a claim settlement evaluation document, recognize an emerging risk and an emerging market using at least one of, an artificial intelligence technique, a machine learning technique and an internet of things network;
determine a risk associated with a quote provided by a user for the risk management instrument; and process an application for the risk management instrument by the user, based on the risk.

7. The system as claimed in claim 1, wherein the risk control formulizer is to perform at least one of:
process the entity data pertaining to the plurality of domains to determine a probable demand for a new risk control tool in future, wherein when the probable demand in a domain is greater than a threshold, wherein the domain is identified as an emerging risk and/or emerging market to formulate new risk control tools;
implement dynamic AI data analysis techniques to perform one of identify fraudulent areas and predict risk trending; and
determine relationship between the external factors associated with the risk control and management task to review risk control and management tools, the external factors including at least one of a demand factor and a price factor.

8. The system as claimed in claim 1, wherein the notification generator is to provide information to a device associated with the entity by performing at least one of:
identifying the existing and potential damage to the covered entities;
providing advice pertaining to reacting to the alerts and existing and potential damages; and
providing a potential reason for the alerts.

9. The system as claimed in claim 1, wherein the intelligent risk management agent is to implement at least one of deep neural network technique, conventional neural technique, an image processing technique, a document similarity technique, a natural language processing technique, and an information retrieval technique to process the entity data provided by the data analyzer.

10. A system comprising:
a data analyzer to provide entity data pertaining to an entity covered by a risk management instrument, based on a risk management task to be performed, the data analyzer comprising, data extractor to obtain the entity data from at least one of a sensor associated with the entity and a risk management database, wherein the entity data includes one or more of: entity-before-damage data and entity-post-damage data pertaining to the entity;
and data pertaining to environmental attributes associated with the entity;
details pertaining to risk control and management associated with the entity, a user associated with the entity, and external related data associated with multiple entities and multiple users;
and live data associated with covered entities, the live data being gathered using remote sensing and IoT monitoring;
and a data pre-processor in communication with the data extractor, the data pre- processor to: determine whether the entity data is to be preprocessed prior to performing the risk management task, based on the risk management task to be performed;
when the entity data is to be pre-processed, normalize the entity data, based on a normalization technique;
and assimilate the entity data to a risk management model using an assimilation technique;
and an intelligent risk control and knowledge management agent in communication with the data analyzer, wherein the intelligent risk control and knowledge is to process the entity data using at least one of an artificial intelligence technique and a machine learning technique to perform the risk management task.

11. The system as claimed in claim 10, wherein the intelligent risk management agent comprises at least one of:
a claim processor to assist in claim processing pertaining to the entity, wherein the claim processor is to perform at least one of: identify a case similar to the entity from the risk management database, using a similarity computation technique, the similar case having a case similarity score within a predefined threshold;
and compute a loss estimation, based on claims settled in the similar case;
a notification generator to generate notifications to the users, the notifications comprising one of alerts to notifying the users of existing and potential damages to the covered entities, and advices on how to react to the alerts and existing and potential damages, wherein the notification generator is to perform at least one of, identify the existing and potential damages to the entity, based on processing of the entity data with respect to reference parameters corresponding to the entity, the reference parameters influencing a computational intelligence measure of a damage to the entity by the artificial intelligence techniques;
generate the alerts to notify the user of the potential damage, when the potential damage is identified;
and provide the advices to how to react on the alerts to prevent the potential damages and losses;
a risk control formulizer (RCF) to process the entity data to formulize the risk control tools, based on at least one of the entity data in a plurality of domains and relationship between various external factors associated with the risk management instrument, wherein the risk control formulizer is to identify emerging risk markets, develop new RCF(s), and review existing RCF(s);
and an agent assistant to process the entity data and related data to supplement a risk control and management task performed by one of an external agent, the user, and an organization providing risk management instruments.

12. The system as claimed in claim 11, wherein the claim processor is to:
determine an entity-before-damage vector and an entity-post-damage vector corresponding to the entity-before-damage data and the entity-post-damage data respectively, the entity-before-damage data and the entity-before-damage comprising an image of the entity; and
compute a damage vector indicative of damage to the entity, based on the entity-before-damage vector and an entity-post-damage vector; and
identify the case similar to the one entity from the risk management database, based on the case similarity score of a vector representing the similar case with respect to the damage vector, the case being identified as the similar case, when the case similarity score is greater than a predefined threshold; and
provide an estimate of loss, based on compensation for damages provided in the similar case.

13. The system as claimed in claim 12, wherein the agent assistant is to:
determine a similarity between an external agent's report on claim settlement and a user's claim document to provide a report similarity score; and
generate a user claim settlement evaluation report to verify an external agent's evaluation, the user claim settlement evaluation report including the report similarity score indicative of an extent of similarity between the external agent's report and the user's claim document.

14. A computer-implemented method, executed by at least one processor, the method comprising:
providing object data pertaining to an entity covered by a risk management instrument based on a risk control and management task to be performed, the entity data being obtained from at least one of an Internet of Things (IoT) device associated with the entity and a risk control and knowledge management database, wherein the entity data includes one or more of, entity-before-damage data and entity-post-damage data pertaining to the entity;
and data pertaining to environmental attributes associated with the entity;
details pertaining to risk control and management associated with the entity, a user associated with the entity, and external related data associated with multiple entities and multiple users;
and live data associated with covered entities, the live data being gathered using remote sensing and IoT monitoring;
and performing a risk management task by processing the entity data using at least one of an artificial intelligence technique and a machine learning technique, wherein performing the risk management comprises at least one of, performing claim processing pertaining to the entity, wherein performing claim processing comprises,
identifying a case similar to the entity from a risk management database, using a similarity computation technique, the similar case having a case similarity score within a predefined threshold;
and computing a loss estimate, based on claims settled in the similar case;
generating notifications to users the notifications comprising one of alerts to notifying the users of existing and potential damages to the covered entities, and advices on how to react to the alerts and the existing and potential damages;
formulizing risk management instruments to perform one of a generating a new risk management instrument, identifying emerging markets, and reviewing an existing risk management instrument, based on at least one of the entity data in a plurality of domains and relationship between various external factors associated with the risk management instrument;
and supplementing the risk management task performed by one of an external agent, a user of the entity, and an organization providing risk management instruments by processing the entity data.

15. The computer implemented method as claimed in claim 14, wherein the providing the entity data comprises: normalizing data obtained from a sensor using a normalization technique; and assimilating normalized data to a risk management model using an assimilation technique, to provide the entity data.

16. The computer implemented method as claimed in claim 15, wherein performing the claim processing comprises:
determining an entity-before-damage vector and an entity-post-damage vector corresponding to the entity-before-damage data and the entity-post-damage data respectively, the entity-before-damage data and the entity-before-damage comprising an image of the entity;
and computing a damage vector indicative of damage to the entity, based on the entity-before-damage vector and the entity-post-damage vector;
and identifying the case similar to the one entity from the risk management database, based on the case similarity score of a vector representing the similar case with respect to the damage vector, the case being identified as the similar case, when the case similarity score is greater than a predefined threshold;
and providing an estimate of loss, based on compensation for damages provided in the similar case.

17. The computer implemented method as claimed in claim 14, wherein supplementing the risk management task performed by the external agent comprises:
determining a similarity between an external agent's report on claim settlement and a user's claim document to provide a report similarity score; and
generating a user claim settlement evaluation report to verify an external agent's evaluation, the user claim settlement evaluation report including the report similarity score indicative of an extent of similarity between the external agent's report and the user's claim document.

18. The computer implemented method as claimed in claim 14, wherein generating the notifications comprises at least one of, identifying the existing and potential damages to the entity, based on processing of the entity data with respect to reference parameters corresponding to the entity, the reference parameters influencing a computational intelligence measure of a damage to the entity by the artificial intelligence techniques;
generating the alerts to notify the user of the potential damage, when the potential damage is identified;
and providing the advices to how to react to the alerts to prevent the potential damages.

19. The computer implemented method as claimed in claim 14, wherein formulizing the risk management instrument comprises:
determining a risk associated with a quote provided by a user for the risk management instrument; and
processing an application for the risk management instrument by the user, based on the risk.

20. The computer implemented method as claimed in claim 14, wherein performing the risk management task comprises:
extracting entities from the entity data obtained from the risk management database, the entities comprising metadata pertaining to the at least entity and metadata associated with a user associated with the entity;
resolving the entity conflicts or multiple names that refer to the same entity;
classifying extracted entities into corresponding categories, a category being indicative of an entity type;
identifying relationships between entities, based on phrases in a risk management instrument defining a relationship; and
implementing one or more machine learning techniques to renew the risk management instrument, based on identified relationships between entities.

* * * * *